Oct. 26, 1926.
V. A. FYNN
1,604,899
ASYNCHRONOUS MOTOR
Filed Oct. 8, 1924
Fig.1.
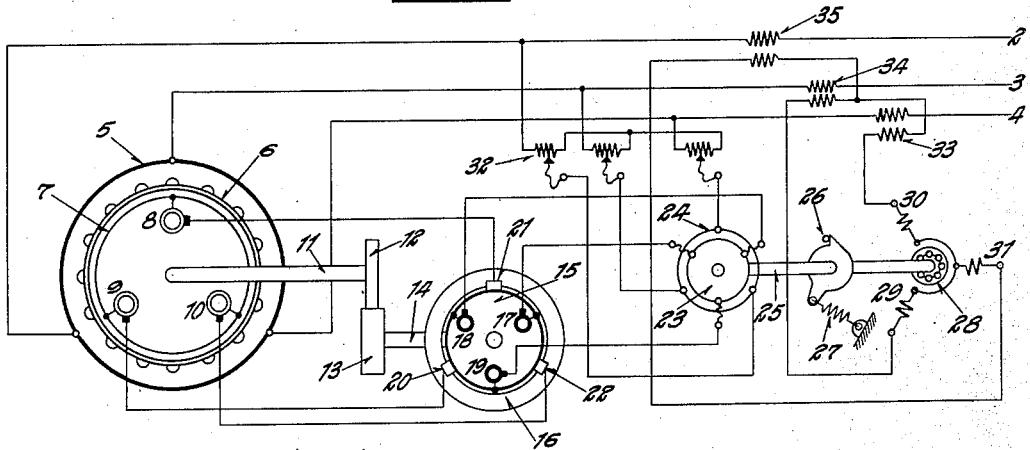
Fig.2.
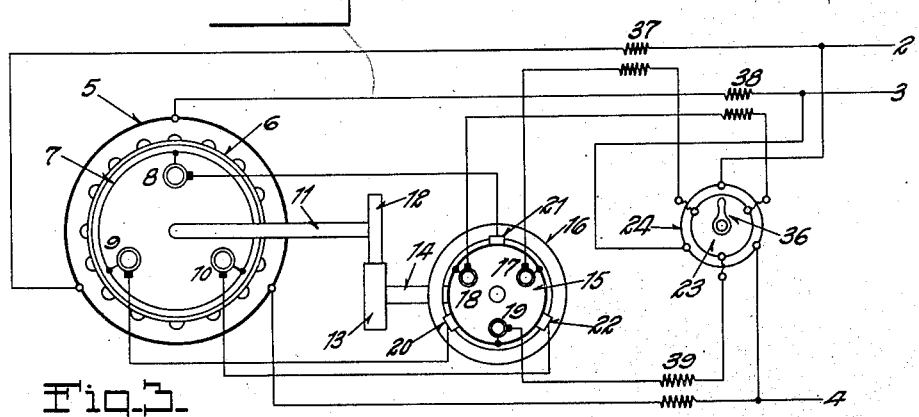
Fig.3.
Fig.4.
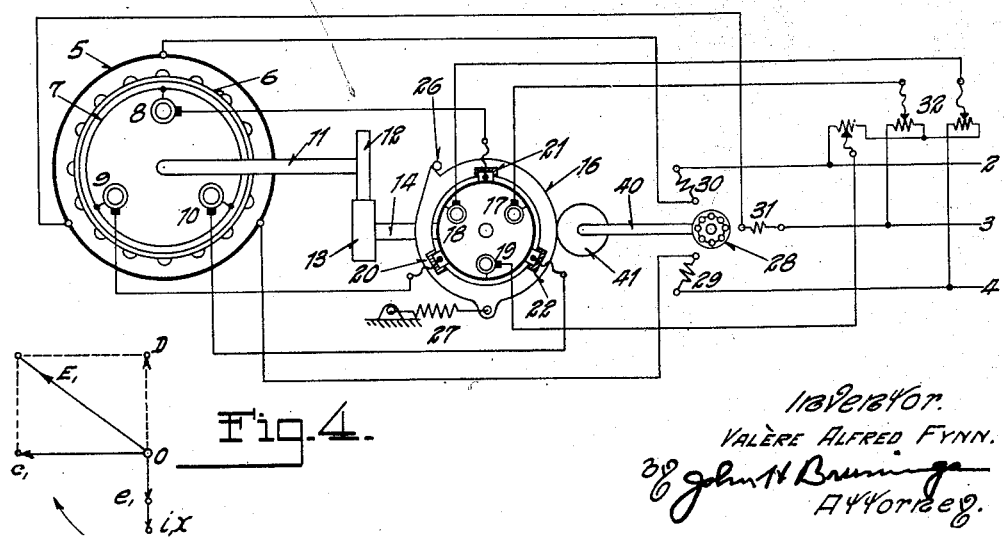
Inventor.
VALÈRE ALFRED FYNN.
By John H Bruninga
Attorney.

Patented Oct. 26, 1926.

1,604,899

UNITED STATES PATENT OFFICE.

VALÈRE ALFRED FYNN, OF ST. LOUIS, MISSOURI.

ASYNCHRONOUS MOTOR.

Application filed October 8, 1924. Serial No. 742,327.

My invention relates to asynchronous induction motors and particularly to the improvement or control of the power factor or to the compensation of polyphase motors of this type.

Generally speaking, in accordance with my invention I provide two windings on the secondary of such motors, placing both in inductive relation to the primary winding, closing one along one or more axes per pole pair and producing by means of the other at least part of the synchronously revolving field or the synchronously revolving fundamental magnetization usually produced in such motors by the primary winding thereof. In addition to this, I preferably make provision for excluding all load currents from that winding on the secondary which is used for producing said basic or fundamental excitation, and I exclude these load currents either at some particular load, at a plurality of loads or at all loads. In carrying out my invention, I shortcircuit what may be termed the secondary load winding in some such manner as is usual in polyphase asynchronous motor practice, and I introduce into the other secondary winding, which may be referred to as the exciting winding, voltages of proper magnitude, phase and direction and of slip frequency. One way of securing voltages of proper frequency is to use a frequency converter say in the form of a synchronous or rotary converter driven in synchronism with the revolving member of the asynchronous motor but connected to the supply through its sliprings and to the secondary of the motor to be compensated through its commutator. The phases and directions of the auxiliary voltages introduced into the exciting winding on the secondary of the asynchronous motor can be chosen to simply co-operate in producing the basic excitation of the machine, whether said voltages produce all of said magnetization or only a part of it depending on the magnitude of the auxiliary voltages, or the phases and directions of the auxiliary voltages can be so chosen that one component of each of said voltages is of correct phase and direction to co-operate in producing the fundamental magnetization of the machine, while the other component of each of said voltages is of the necessary phase and direction to co-operate in opposing the production or flow of load current in the secondary exciting winding into which said voltages are introduced. In order to more fully eliminate load currents from the exciting winding at a pluraltiy of loads or at all loads, I provide means for causing the phase of the auxiliary voltages as they appear at the terminals of the exciting winding to change with changing load and with respect to the phase of those voltages set up within the exciting winding which would ordinarily be responsible for the load currents in a winding located in the manner in which said exciting winding is placed.

The objects and features of this invention will more clearly appear from the detailed description taken in connection with the accompanying drawings and will be pointed out in the claims.

In the accompanying diagrammatic two-pole drawings, Figs. 1, 2 and 3 show several embodiments of my invention, Fig. 4 is an explanatory diagram.

Referring to Fig. 1 which illustrates a three-phase asynchronous motor with independent or external exciter, the primary of the asynchronous motor, here the stator, is provided with an ordinary three-phase winding 5 connected to the three-phase supply 2, 3, 4 with the interposition of the series transformers 33, 34, 35. The secondary of this motor, here the rotor, carries two secondary windings, a squirrel cage 6 and a three-phase winding 7 provided with the sliprings 8, 9, 10. A two-pole exciter, the armature 15 of which is provided with a commuted winding connected to a commutator with which co-operates a polyphase arrangement of brushes 20, 21, 22 and also connected to a polyphase arrangement of sliprings 17, 18, 19, is mounted on the shaft 14 and driven from the shaft 11 of the asynchronous motor by means of the gear wheels 12 and 13 which are of same pitch diameter because the number of poles in the asynchronous motor and its exciter is the same in this example. The brushes 20, 21, 22 co-operating with the commutator of this frequency converter used as an exciter are connected to the sliprings 8, 9, 10 of the asynchronous motor and the sliprings 17, 18, 19 of the exciter are connected to the supply through the induction phase regulator 23, 24, the primary of which is connected to the supply through the adjustable three-phase transformer 32. The armature of the frequency converter is surrounded by a stationary laminated structure 16, separated from the armature 15 by a short air-gap and preferably devoid of defined polar projections. Normally the movable member 23 of the induction regulator is under the control of the spring 27 which holds 23 in a position determined by the stop 26, which co-operates with a suitable projection of a disc mounted on the shaft 25 which carries the movable member 23. This same shaft also carries the squirrel cage rotor 28 of a three-phase motor which here acts as a relay and the primary windings 29, 30, 31 of which are connected in star and to the star connected series transformers 33, 34, 35. The connections are so made that with increasing current in the primary of the asynchronous motor the relay 28 exerts a torque which tends to overcome the spring 27 and move the member 23 of the induction regulator in a clockwise direction. A movement of 23 changes the phase of the voltages impressed on the sliprings of the exciter and thus changes the phase of the auxiliary voltages appearing at the brushes 20, 21, 22 whenever said exciter revolves at a speed which differs from its synchronous speed. In this way is changed the phase of the auxiliary voltages impressed on the secondary exciting winding 7 of the asynchronous motor. The magnitude of these voltages can be changed by means of the adjustable three-phase transformer 32. The brushes 20, 21, 22 co-operating with the commuted winding on the armature 15 of the exciter are supposed to rest directly on said winding which is represented by a plain circle. In practice the brushes in question would co-operate with a commutator connected to said commuted winding.

In Fig. 2 the stator of the asynchronous motor is provided with a three-phase winding 5 and its rotor or secondary carries a squirrel cage working winding 6 and a three-phase exciting winding 7 connected to the sliprings 8, 9, 10. The armature 15 of the frequency converter, here used as an exciter, is mounted on the shaft 14 driven by means of the gear wheels 12 and 13 from the shaft 11 of the asynchronous motor. The armature of this exciter is provided with a commuted winding with which co-operates a three-phase arrangement of commutator brushes 20, 21, 22 and which is also connected to a three-phase arrangement of sliprings 17, 18, 19. The armature 15 is surrounded by a stationary laminated body 16 separated from the armature by a short air-gap and devoid of polar projections. The commutator brushes 20, 21, 22 are connected to the exciting winding 7 of the asynchronous motor by way of the sliprings 8, 9, 10 and brushes co-operating with same. The sliprings 17, 18, 19 of the exciter are connected to an induction phase regulator 23, 24 with the interposition of the secondaries of the series transformers 37, 38, 39, the primaries of which are included between the supply 2, 3, 4 and the terminals of the primary 5 of the asynchronous motor. The position of the movable member 23 of the induction regulator can be changed with the help of the handle 36.

Referring to Fig. 3, the construction of the asynchronous motor is here identical with that described in connection with Figs. 1 and 2 and the frequency converter used as an exciter is driven as in the previous figures, but while its armature is identical in design, the commutator brushes 20, 21, 22 co-operating with the commuted winding are arranged to be moved or shifted circumferentially during the operation of the asynchronous motor. To this end said brushes are insulatingly carried by the laminated structure 16 or some other similar means and normally under the control of the spring 27, which holds said brushes in a position determined by the stop 26 co-operating with a suitable projection on the brush rocker arm 16. The brushes 20, 21, 22 are connected to the exciting winding 7, of the asynchronous motor through the sliprings 8, 9, 10 as in the other examples. The sliprings 17, 18, 19 of the exciter are connected to the mains 2, 3, 4 by means of the three-phase transformer 32. A three-phase relay, the squirrel cage rotor 28 of which is adapted to co-operate with the laminated structure 16 here used as a brush rocker arm through the shaft 40 and the gear wheel 41, is provided with primary windings 29, 30, 31 which are connected to the supply 2, 3, 4 in series with the primary winding 5 of the asynchronous motor. With increasing current in the primary 5 the squirrel cage rotor exerts an increasing clockwise torque, overpowers the spring 27 and moves the brushes 20, 21, 22 in a counterclockwise direction, this movement increasing with the load on the asynchronous motor.

It will be understood that while the invention has been shown as applied to a three-phase asynchronous inducton motor, it is applicable to this type of machine regardless of the number of phases for which it is wound and is therefore equally applicable to a two-phase machine. While it has been found most convenient to show the secondary working winding in the form of a squirrel cage, it will be evident to anyone familiar with the art that any kind of secondary winding such as is commonly used in polyphase asynchronous motors can be employed instead of the squirrel cage shown just so this winding is or can be closed in normal operation along one, but preferably along a plurality of axes per pole pair. Similarly, the exciting winding 7 located on the secondary need not be a mesh connected three-phase winding but can, as will be well understood, be star connected and wound for any number of phases regardless of the number of phases for which the primary of the asynchronous motor is wound. While for the sake of simplicity the frequency converter used as an exciter, as well as the asynchronous motor, have been shown throughout as two-pole machines, in practice the asynchronous motor will usually be wound for more than two poles, and generally speaking, the number of poles of the exciter will differ from the number of poles of the asynchronous motor and will usually be considerably less than that of the latter. Under such conditions, the pitch diameter of the gear wheels 12 and 13 will not be the same, but will differ in the ratio of the number of poles of the two machines and must be so chosen that when the asynchronous motor runs synchronously the exciter or frequency converter also runs synchronously. While an induction regulator has been shown in some cases for the purpose of changing the phase of the voltages impressed on the sliprings of the exciter, yet it will be understood that the same object can be achieved by well known combinations of adjustable ratio static transformers.

Turning now to the mode of operation of the various embodiments here described and referring at first more particularly to Fig. 1, the polyphase asynchronous motor there shown can be started in any desired and known manner. During the starting operation the connection between the exciting winding 7 and the exciter 15, 16 may be interrupted or not as desired. This exciter may during this period be connected to the supply or not. The asynchronous motor is capable of normal operation without the help of the exciter, but if it is desired to improve the power factor of the asynchronous motor, then the exciter should be connected as shown. Assuming that the asynchronous motor is running at no load and driving the armature 15 of the exciter but that the series transformers 33, 34, 35 are removed and that the primary 24 of the induction regulator is disconnected from the supply but that the exciting winding 7 is connected to the brushes 20, 21, 22 co-operating with the commuted winding on the exciter, then whatever secondary load currents are necessary to keep the asynchronous motor running light will divide between the two secondary windings of this machine in accordance with the impedances of the circuits comprising said windings and the working volts per unit of impedance generated in said winding. It will be clear that the greater portion of said load currents will close through the squirrel cage load winding 6, the rest closing through the exciting winding 7 and the exciter 15. If under those conditions the load on the asynchronous motor is increased, the secondary load currents will increase correspondingly but the greater portion of these currents will still close through the squirrel cage winding 6. The load currents in either secondary winding 6 or 7 are due to voltages generated in said windings by the synchronously revolving basic or fundamental magnetization of the asynchronous motor. These voltages are of slip frequency and may be referred to as working voltages. It is known that in machines of ordinary construction these working voltages are of a magnitude which is just sufficient to force the working current through the impedance of the secondary circuit within which said voltages are generated, and it is further known that near synchronism the impedance of any secondary circuit of an asynchronous polyphase motor is very small and does not materially differ from the ohmic resistance of the circuit in question. When I desire to compensate a polyphase asynchronous motor such as that shown in Fig. 1, I introduce into each circuit of that secondary winding 7, which is to do duty as exciting winding, a voltage leading the working voltage in that circuit by substantially ninety degrees. In Fig. 1 this relation of auxiliary to working voltage is secured after the sliprings 8, 9, 10 have been connected to the brushes 20, 21, 22 of the exciter by connecting the primary 24 of the induction regulator to the mains 2, 3, 4 by means of the three-phase transformer 32 and then so locating the stop 26 that the auxiliary voltages of line frequency impressed by the movable member 23 of the induction regulator on the sliprings 17, 18, 19 of the exciter will have a phase such that the phase of the auxiliary slip frequency voltages appearing at the commutator brushes will have the desired quadrature leading phase relation to the working voltages generated in the commutator secondary 7 to which the brushes are connected. The phase of these auxiliary rotor exciting voltages having been properly selected, it only remains to suitably choose the magnitude of said voltages in order to achieve the desired phase compensation. If the magnitude in question is so selected that the revolving field produced by the exciting currents thus set into the secondary 7 of the asynchronous motor is less in magnitude than the fundamental magnitization normally produced by the primary 5 of the asynchronous motor, then the power factor of the machine will be improved but will not reach unity. An increase in the magnitude of the voltages impressed on the sliprings of the exciter will cause an increase in the synchronously revolving field produced by the rotor and a corresponding decrease in the lagging magnetizing currents taken by the primary 5 of the asynchronous motor. Said primary magnetizing currents can in this manner be reduced to zero, whereupon a further increase of the voltages applied to the sliprings of the exciter will cause the primary 5 of the asynchronous motor to take leading currents and thus counterbalance or neutralize a part of the revolving field produced by the rotor. The remaining field now forms all of the basic or fundamental magnetization of the machine.

While thus operating this compensated machine, the circuit 7 of the secondary of the asynchronous motor may carry not only exciting currents due to the voltages introduced into this circuit by means of the commutator brushes 20, 21, 22 of the exciter, but may also carry a certain proportion of the secondary load currents, necessitating a correspondingly larger amount of copper in the exciting winding 7, a correspondingly larger exciter and correspondingly larger associated apparatus.

When it is desired to entirely eliminate all load currents from the exciting winding 7 at some particular load, then the phase of the auxiliary voltages of line frequency impressed on the sliprings of the converter-exciter must be so chosen that the commutator brush voltages introduced into the secondary 7 of the asynchronous motor shall lead the working voltages in said secondary by substantially more than ninety degrees. Under these conditions, the auxiliary voltages E introduced into the secondary 7 may be each decomposed into two components, one of which leads the corresponding working voltage by ninety, while the other leads it by one hundred eighty degrees. The first of these may be referred to as the exciting component $c$ and the second as the load current opposing component $a$. When the load or the slip is such that the working voltage $e$ in each circuit of 7 equals the component $a$ of the auxiliary voltage E in that circuit, then said circuit will carry exciting current only and no load current whatsoever. This change is easily accomplished in Fig. 1 by suitably moving the stop 26.

If it is desired to eliminate the load currents from the exciting winding 7 of the asynchronous motor at all motor loads, then it is necessary to change the phase of the auxiliary voltages introduced into 7 from the exciter 15 with every change of load on the asynchronous motor. While this can be done by hand by appropriately moving the member 23 of the induction regulator, the relay 28, 29, 30, 31 performs this function automatically in Fig. 1. The stator windings of this relay are connected to the secondaries of the series transformers 33, 34, 35, the primaries of which are connected to the supply 2, 3, 4 in series with the primary 5 of the asynchronous motor. The magnetization of this relay therefore increases with increasing load on the asynchronous motor, correspondingly increasing the torque exerted by the squirrel cage 28 of the relay, which torque overcomes the spring 27 and moves the member 23 of the induction regulator in the proper direction and through a suitable angle. But if the phase of the auxiliary voltages E is changed with changing motor load and without changing the magnitude of said voltages, then while the working voltages in the secondary 7 may be properly opposed or neutralized at each load, yet the exciting component $c$ of each auxiliary voltage E will decrease with increasing load thus reducing the compensation of the asynchronous motor. Should it be desired to keep the compensation of said machine constant, then it is necessary to increase the magnitude of the auxiliary voltages as their lead over the corresponding working voltages is increased. In Fig. 1 this can be achieved by means of the adjustable three-phase transformer 32.

Turning now to Fig. 2. This differs from Fig. 1 in that the induction regulator 23, 24 is connected directly to the supply 2, 3, 4 and further in that one winding of the three series transformers 37, 38, 39 acting as variable reactances is included in each circuit between the secondary 23 of the induction regulator and the sliprings of the exciter armature 15, while the other winding of each of the series transformers is included in one of the primary circuits of the induction motor. Under these conditions, the member 23 of the induction regulator delivers, when moved, voltages which vary in phase but not in magnitude and each of the series transformers 37, 38, 39 can be looked upon as a variable positive reactance in so far as the slipring circuit of the exciter is concerned. Seeing that each exciting current injected into the secondary 7 by means of the exciter 15 is, near synchronism, practically in phase with each exciting voltage and that each of the latter leads by ninety degrees the corresponding working voltage in 7, the working voltages in said winding may be looked upon as positive reactance voltages in so far as the exciting current is concerned and since these working voltages increase with increasing load or slip, I have conceived the idea of including in the exciting circuit, and preferably in the line frequency exciting circuit, other voltages which will have the same lagging phase relation with respect to the exciting currents as said working voltages, but which will diminish as the load or the slip increases. In this manner I can keep practically constant the sum of those voltages in the exciting circuit which lag about ninety degrees behind the exciting voltages. If I now impress on the exciting circuit auxiliary voltages of such magnitude and phase that one component of each of said voltages will equal and oppose the sum of the working and of the positive reactance voltages while the other will lead said voltages by ninety degrees, then whatever change may take place in the relative magnitude of the working voltages generated in 7 and the reactance voltages in the external positive reactances such as 37, 38, 39 will at all times leave the magnitude of the exciting voltage undisturbed and the working voltages equalled and opposed. The phase diagram of Fig. 4 illustrates this relation for one phase of the secondary 7 of the asynchronous motor but on the line frequency side of the frequency converter. The line frequency voltages are distinguished from the corresponding slip frequency voltage by the sub numeral 1. At the instant for which this diagram holds, the working voltage $e_1$ is twice as large as the reactance voltage $i_1x$ absorbed in the corresponding series transformer. The auxiliary voltage $E_1$ impressed on this circuit has one component OD equal and opposed to the sum of $e_1$ and $i_1x$ and another component $c_1$ leading $e_1$ by ninety degrees. Should the load on the asynchronous motor decrease, then $e_1$ decreases and since the primary current of the asynchronous motor also decreases and in the same proportion as $e_1$, then $i_1x$ increases; the sum of the two, however, remains practically constant. In this way the working voltages are always opposed by part of the auxiliary voltages and the rotor excitation of the asynchronous motor which depends on the magnitude and phase of $c_1$ remains practically constant. Furthermore, while the line frequency voltage as measured at the terminals of the movable element 23 of the induction regulator remains constant as to phase and magnitude, yet both phase and magnitude of the auxiliary voltage actually impressed on the sliprings of the exciter do change, the lead of the auxiliary voltage as measured at the sliprings and its magnitude, and consequently also the lead and magnitude of the slip frequency auxiliary voltage E, increasing with increasing load.

When the asynchronous motor is running light and there is practically no current in the high tension coils of the transformers 37, 38, 39, then the positive reactance of their low tension coils, which are in circuit with the sliprings of the exciter, is at a maximum. The reactance voltage in the low tension winding of each series transformer is $i_1x$, where $i_1$ is the exciting current and constant and where $x$ is the reactance of the series transformer which varies with the current in the high tension winding thereof. This reactance will be a minimum when the currents in the two windings of each of the series transformers produce ampereturns which are equal in number and differ in phase by one hundred eighty degrees. This condition can readily be brought about by suitably locating the secondary 23 of the induction regulator by means of the handle 36. In this discussion the magnetizing currents required by the frequency converter are neglected because they are usually comparatively small. If the converter is not operated to about unity power factor, they cause a small phase displacement as well as an increase of the total slipring current of the frequency converter and therefore also of the current in those windings of the series transformers 37, 38, 39 which are in circuit with the frequency converter. The ampereturns due to this converter exciting current in the series transformer windings included in the converter slipring circuits can, when worth while, be taken into consideration in adjusting the phase and magnitude of the ampereturns in the other windings of the series transformers. If the conditions are so chosen that the asynchronous motor is excited to operate with unity power factor throughout, then the current in the primary 5 will be practically in phase with the line voltage. Furthermore if the conditions are so chosen that nothing but exciting current circulates in the secondary 7, then the phase relation of that current as reflected in the line periodicity circuit, which includes the movable member 23 of the induction regulator, will depend on the position of this movable member, in other words, on the phase of the voltages impressed on the sliprings of the exciter by the induction regulator. It follows that the movable member 23 of this induction regulator can always be so placed as to secure practical phase opposition or any other phase relation between the exciting current in the low tension winding and the primary load current in the high tension winding of each series transformer. But changing the phase of the voltages delivered by the secondary 23 of the induction regulator also changes the phase of the commutator brush voltage on the exciter and to bring this back to secure the desired quadrature relation between this commutator brush voltage and the generated working voltage in the secondary 7, it is only necessary to suitably displace the commutator brushes.

When in Fig. 2 the magnitude of the voltage delivered by the secondary 23 of the induction regulator is properly chosen, then the conditions outlined in connection with the diagram of Fig. 4 can be readily secured by suitably locating this movable member 23 with relation to the primary member 24 and placing the commutator brushes 20, 21, 22 in the proper position on the commutator of the exciter so as to secure the desired phase relations within the circuit of the secondary 7 of the asynchronous motor. In addition to this, the series transformers must, of course, be properly dimensioned as to number of turns and cross section of iron. When the said conditions are fulfilled, then the arrangement shown in Fig. 2 will keep the excitation of the asynchronous motor practically constant at all loads, and will at all times practically exclude all load currents from the secondary exciting winding 7 of the asynchronous motor. As a rule, the induction regulator will be set once for all when adjusting the machine and in such cases ordinary static transformers can be suitably combined and used instead of the induction regulator.

Fig. 3 differs from Fig. 2 in that there is no provision for changing the phase of the voltages impressed on the sliprings of the exciter, but the magnitude of these voltages can be adjusted by means of the three-phase transformer 32. It further differs from Fig. 2 in that provision is made to displace the commutator brushes in response to load variations. In operating this machine, the commutator brushes are so located that when the asynchronous motor runs at no load there is nothing but exciting current in the secondary 7 thereof, which means that the brush voltages then impressed on the sliprings of the winding 7 lead the working voltages of said winding by a little more than ninety degrees. As the load increases, the commutator brushes 20, 21, 22 are moved in such a direction as to cause the voltages appearing at said brushes to lead the working voltages in 7 by an ever increasing angle and this movement of the commutator brushes is brought about by a three-phase motor or relay, the stator windings 29, 30, 31 of which are included in series with the primary terminals of the asynchronous motor. These magnetizing windings co-operate with a squirrel cage or similar rotor 28 and cause it to exert an ever-increasing torque which is transmitted to the brush carrier 16 by means of the shaft 40 and the gear 41 and which moves the commutator brushes in the desired direction and at the desired rate in opposition to the effort of the spring 27 which tends to bring the brush rocker arm back against the stop 26, in which position the commutator brushes supply voltages of correct phase for the no-load condition of the asynchronous motor. In this embodiment of my invention the secondary exciting winding 7 of the asynchronous motor is kept practically free from load currents, but the magnitude of the excitation produced by the secondary of said motor changes with changing position of the commutator brushes, diminishing as the load increases. This embodiment may be operated by over-exciting the motor at no load and causing it to operate with unity power factor at some selected load, for instance at full load, at maximum load or at any other load. The degree of maximum or minimum compensation can readily be adjusted by changing the magnitude of the voltages impressed on the sliprings of the exciter, which in this case can be achieved by means of the three-phase transformer 32.

It is immaterial whether it is the secondary or the primary of the asynchronous motor which revolves, the mode of operation remains exactly the same. When the primary revolves, it rotates against the direction of rotation of the revolving field or of the basic magnetization of the motor.

To what extent the invention is taken advantage of depends on the preference of the user. When load currents are practically eliminated from the exciting winding on the secondary, the conditions are very favorable. The magnetic circuit of the motor should preferably have no polar projections and may be designed as is usual in asynchronous polyphase motor practice, but in dimensioning the circuits, it should be remembered that the primary windings in such a motor carry nothing but working currents and not working and magnetizing currents as in the ordinary polyphase motor and that one of the windings on the secondary carries nothing but secondary load or working currents while the other winding on the secondary carries nothing but exciting currents. This last is that which is connected to the external exciter and under the conditions named, this exciter, its commutator and its brushes need only be dimensioned to take care of the exciting currents which are small in asynchronous polyphase motors because of the usually very short air-gaps used. These exciting amperes may remain constant at all loads and the voltage on the commutator of the exciter may be chosen as low as desired.

Throughout this specification the term primary member is applied to that member which carries the windings connected to the supply, which windings carry the line working currents, and whether or not these primary windings produce the revolving flux of the motor which flux always revolves synchronously with respect to the primary member. The other member is referred to as secondary whether or not it carries a winding or windings which produce all or a part of the revolving flux.

It is well known that any motor can be operated as a generator provided it be driven by a prime mover at a suitable speed, and it is also generally recognized that non-synchronous polyphase motors are no exception to this rule. It is further known that in the case of an asynchronous motor the voltages generated by the primary flux in any winding on the secondary change their direction when the machine passes from sub to super-synchronous speeds, thereby causing the machine to send working currents back to the line instead of drawing such currents from the supply. To keep the exciting circuits free from other than exciting currents is, of course, desirable whether the machine operates as a motor or as a generator. It is, therefore, to be understood that the terms used with reference to motor structures and operation are employed descriptively rather than limitatively.

While theories have been advanced in connection with the machines referred to herein, this has been done with a view to facilitating their description and understanding, but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what I claim is:

1. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, and introducing these auxiliary voltages into the other secondary circuit to produce at least part of the synchronously moving flux and to oppose the formation of working currents in said other secondary circuit.

2. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, and introducing these auxiliary voltages into the other secondary circuit to produce at least part of the synchronously moving flux and to oppose the working voltages generated in said other secondary circuit.

3. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and varying the phase of the auxiliary voltages with varying load on the motor.

4. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and varying the magnitude of the auxiliary voltages with varying load on the motor.

5. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and varying with varying load on the motor the phase relation between the working current producing voltages and the auxiliary voltages.

6. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and varying with varying load on the motor the impedance of the circuits comprising the source of auxiliary slip frequency voltages.

7. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and varying with varying load on the motor the impedance of the line frequency circuits of the source of auxiliary slip frequency voltages.

8. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and increasing the lead of the auxiliary voltages over the voltages generated in the secondary as the load on the motor increases.

9. The method of operating an asynchronous polyphase motor the torque of which depends on a flux moving synchronously with respect to the primary, comprising generating polyphase working voltages of slip frequency in independent secondary circuits, facilitating the formation of working or torque producing currents of slip frequency in one of the secondary circuits, producing auxiliary polyphase voltages of slip frequency, introducing these auxiliary voltages into the other secondary circuit to produce at least part of the synchronously moving flux and to oppose the working voltages generated in said other secondary circuit, and increasing the magnitude of the auxiliary voltages and their lead over the voltages generated in the secondary as the load on the motor increases.

10. In an asynchronous polyphase motor, a primary, a secondary, a winding on the secondary closed along at least one axis per pole pair, another winding on the secondary, and means external to the motor for generating auxiliary polyphase voltages of slip frequency and introducing them into the second winding on the secondary, the phase of the slip frequency voltages differing by about ninety degrees from the phase of the voltages generated in the second winding by the revolving flux of the motor.

11. In an asynchronous polyphase motor, a primary, a secondary, a winding on the secondary closed along at least one axis per pole pair, another winding on the secondary, and means external to the motor for generating auxiliary polyphase voltages of slip frequency and introducing them into the second winding on the secondary, the phase of the slip frequency voltages differing by more than ninety degrees and less than 180 degrees from the phase of the voltages generated in the second winding by the revolving flux of the motor.

12. In an asynchronous polyphase motor, a primary, a secondary, a winding on the secondary closed along at least one axis per pole pair, another winding on the secondary, and means external to the motor for generating auxiliary polyphase voltages of slip frequency and introducing them into the second winding on the secondary, the phase of the slip frequency voltages leading by more than ninety degrees and less than 180 degrees the phase of the voltages generated in the second winding by the revolving flux of the motor.

13. In an asynchronous polyphase motor, a primary, a secondary, a winding on the secondary closed along at least one axis per pole pair, another winding on the secondary, means external to the motor for generating auxiliary polyphase voltages of slip frequency and introducing them into the second winding on the secondary, and means for varying the phase of the slip frequency voltages adapted to oppose the formation of working currents in said second winding.

14. In an asynchronous polyphase motor, a primary, a secondary, a winding on the secondary closed along at least one axis per pole pair, another winding on the secondary, means external to the motor for generating auxiliary polyphase voltages of slip frequency and introducing them into the second winding on the secondary, and means for varying the magnitude and the phase of the slip frequency voltages adapted to oppose the formation of working currents in said second winding.

15. In an asynchronous polyphase motor, a primary, a secondary, a winding on the secondary closed along at least one axis per pole pair, another winding on the secondary, means external to the motor for generating auxiliary polyphase voltages of slip frequency and introducing them into the second winding on the secondary and means for changing the phase relation between the auxiliary voltages and those generated in the second winding on the secondary by the revolving flux of the motor adapted to oppose the formation of working currents in said second winding.

16. In an asynchronous polyphase motor, a primary, a secondary, a winding on the secondary closed along at least one axis per pole pair, another winding on the secondary, a rotary converter driven by the motor and having a commutator, and a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux.

17. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, and a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux.

18. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux, and means for varying the phase of the slip frequency voltages.

19. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux, and means for varying the magnitude of the slip frequency voltages.

20. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux, and impedances having positive reactance in circuit with the line frequency side of the converter.

21. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that one component of each of said voltages produces part of the synchronously revolving flux of the motor while the other opposes a working current producing voltage generated in said second winding by said revolving flux, impedances having positive reactance in circuit with the line frequency side of the converter, and means for varying the magnitude of said impedances when the load on the motor varies.

22. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that each of said voltages produces part of the synchronously revolving flux of the motor, and means for varying the phase of the line frequency voltages impressed on said sliprings adapted to oppose the formation of working currents in said second winding.

23. In an asynchronous polyphase motor, a primary, a secondary, a winding on the secondary, a rotary converter driven by the motor and having a commutator and sliprings, connections from said sliprings to the line, a polyphase arrangement of brushes on said commutator connected to said secondary winding, and a polyphase arrangement of series transformers each of which has one winding in circuit with one of said sliprings and another in circuit with the primary of the asynchronous motor, said series transformers being adapted to keep the current in the secondary exciting circuits approximately constant for a plurality of motor loads.

24. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding, and a polyphase arrangement of series transformers each of which has one winding in circuit with one of said sliprings and another in circuit with the primary of the asynchronous motor, said series transformers being adapted to keep the current in the secondary exciting circuits approximately constant for a plurality of motor loads.

25. In an asynchronous polyphase motor, a primary, a secondary, a polyphase winding on the primary, a winding on the secondary closed along at least one axis per pole pair, another winding on the secondary, a rotary converter driven by the motor and having a commutator and sliprings, a polyphase arrangement of shunt transformers connecting the line to said sliprings, and a polyphase arrangement of series transformers each having one winding in circuit with one of said sliprings and another in circuit with at least one phase of the primary winding on the motor, said series transformers being adapted to keep the current in the secondary exciting circuits approximately constant for a plurality of motor loads.

26. In an asynchronous polyphase motor, a primary, a secondary, a winding on the secondary closed along at least one axis per pole pair, another winding on the secondary, a rotary converter driven by the motor and having a commutator and sliprings, connections from said sliprings to the line, a polyphase arrangement of brushes on said commutator connected to said second secondary winding to impress thereon voltages of slip frequency and of such phase that each of said voltages produces part of the synchronously revolving flux of the motor, and means for varying the phase of the slip frequency voltages adapted to oppose the formation of working currents in said second winding.

27. In an asynchronous polyphase motor, a primary, a secondary, polyphase working and exciting circuits on the secondary in inductive relation to the primary, frequency converting means external to the motor, means including the frequency converting means for introducing slip frequency polyphase auxiliary voltages into the secondary exciting circuits for producing at least part of the revolving field of the motor, and means for keeping the currents in the revolving field producing secondary circuits approximately constant irrespective of motor load variations.

28. In an asynchronous polyphase motor, a primary, a secondary, polyphase working and exciting circuits on the secondary in inductive relation to the primary, frequency converting means external to the motor, means including the frequency converting means for introducing slip frequency polyphase auxiliary voltages into the secondary exciting circuits for producing at least part of the revolving field of the motor, and means for opposing the formation of working currents in the revolving field producing secondary circuits.

29. In an asynchronous polyphase motor, a primary, a secondary, polyphase working and exciting circuits on the secondary each having working voltages induced therein, frequency converting means external to the motor, means including the frequency converting means for introducing slip frequency polyphase auxiliary voltages into the secondary exciting circuits which lead the working voltages generated in said circuits by substantially more than 90 degrees, positive reactances in the exciting circuits, and means for keeping approximately constant at a plurality of motor loads the sum of the working voltage generated in an exciting circuit and the voltage at the terminals of the positive reactance in circuit with said exciting circuit.

In testimony whereof I affix my signature this 2nd day of October, 1924.

VALÈRE ALFRED FYNN.